United States Patent [19]

Villani

[11] Patent Number: 4,794,836
[45] Date of Patent: Jan. 3, 1989

[54] HONEYCOMB CORE CUTTING TOOL

[75] Inventor: Vincent Villani, Sepulveda, Calif.

[73] Assignee: Lockheed Corporation, Calabasas, Calif.

[21] Appl. No.: 74,740

[22] Filed: Jul. 17, 1987

[51] Int. Cl.⁴ ............................................. B23P 15/28
[52] U.S. Cl. ...................................... 83/853; 83/469; 83/666; 407/1; 407/53; 407/120; 407/2; 30/347; 82/53
[58] Field of Search .................. 83/469, 925, 923, 853, 83/831, 854, 849, 847, 855, 666, 670, 469; 30/347, 351, 353, 349, 328, 363, 370, 369; 407/1, 51, 35, 43, 2, 55, 56, 30, 61, 60, 120, 53; 82/53

[56] References Cited

U.S. PATENT DOCUMENTS

| | | | |
|---|---|---|---|
| 1,711,102 | 4/1929 | Sierra | 83/854 |
| 2,111,986 | 3/1938 | Modin | 83/666 |
| 2,894,583 | 7/1959 | Johnstad | 164/70 |
| 3,491,818 | 1/1970 | Schaller | 83/666 |
| 4,388,848 | 7/1983 | Albert | 83/666 |
| 4,551,918 | 11/1985 | Smithberg | 407/51 |
| 4,620,821 | 11/1986 | Roth | 407/1 |
| 4,641,562 | 2/1987 | Clark | 83/664 |
| 4,677,886 | 7/1987 | New | 82/53 |

Primary Examiner—Frederick R. Schmidt
Assistant Examiner—Blynn Shideler
Attorney, Agent, or Firm—Louis L. Dachs

[57] ABSTRACT

The invention is a honeycomb core cutting tool wherein a primary cutter is used to cut the core to shape and secondary cutters are used to immediately shred that portion of the core being removed. The primary cutter is typically a commercially available circular saw blade modified by the machining of a plurality of peripherally located, radially inward directed slots dividing the primary cutter into segments which can be formed into a concave shape. A retainer threadably engages the end of the shaft and is used to force the primary cutter against a concave surface of a flange mounted to the shank of the tool, causing the primary cutter to deform into the concave shape. Mounted behind the flange and primary cutter are two "slot" cutters for shredding the portion of the core being removed.

9 Claims, 2 Drawing Sheets

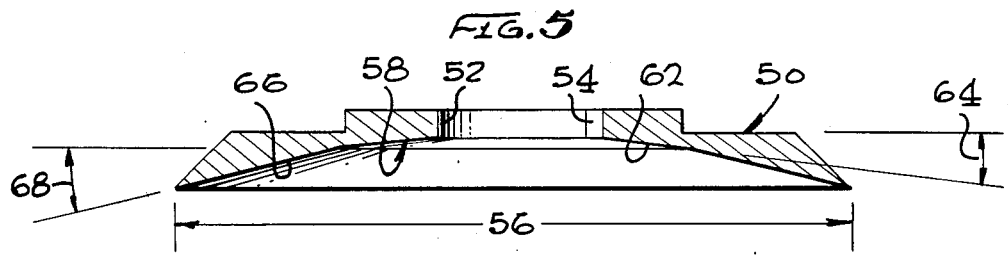
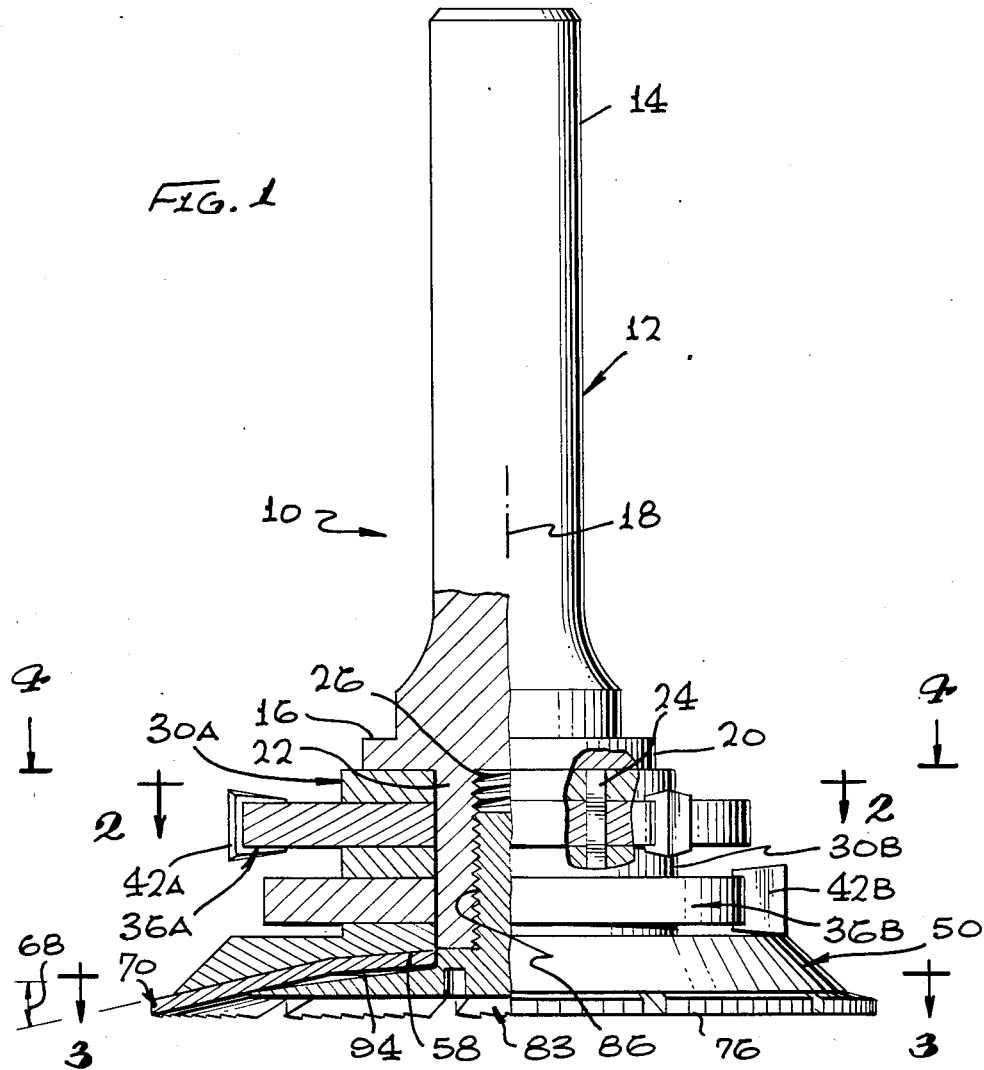
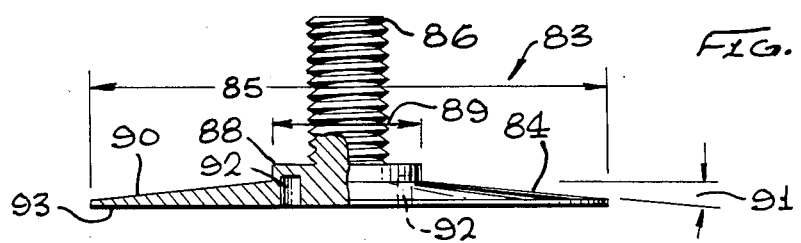

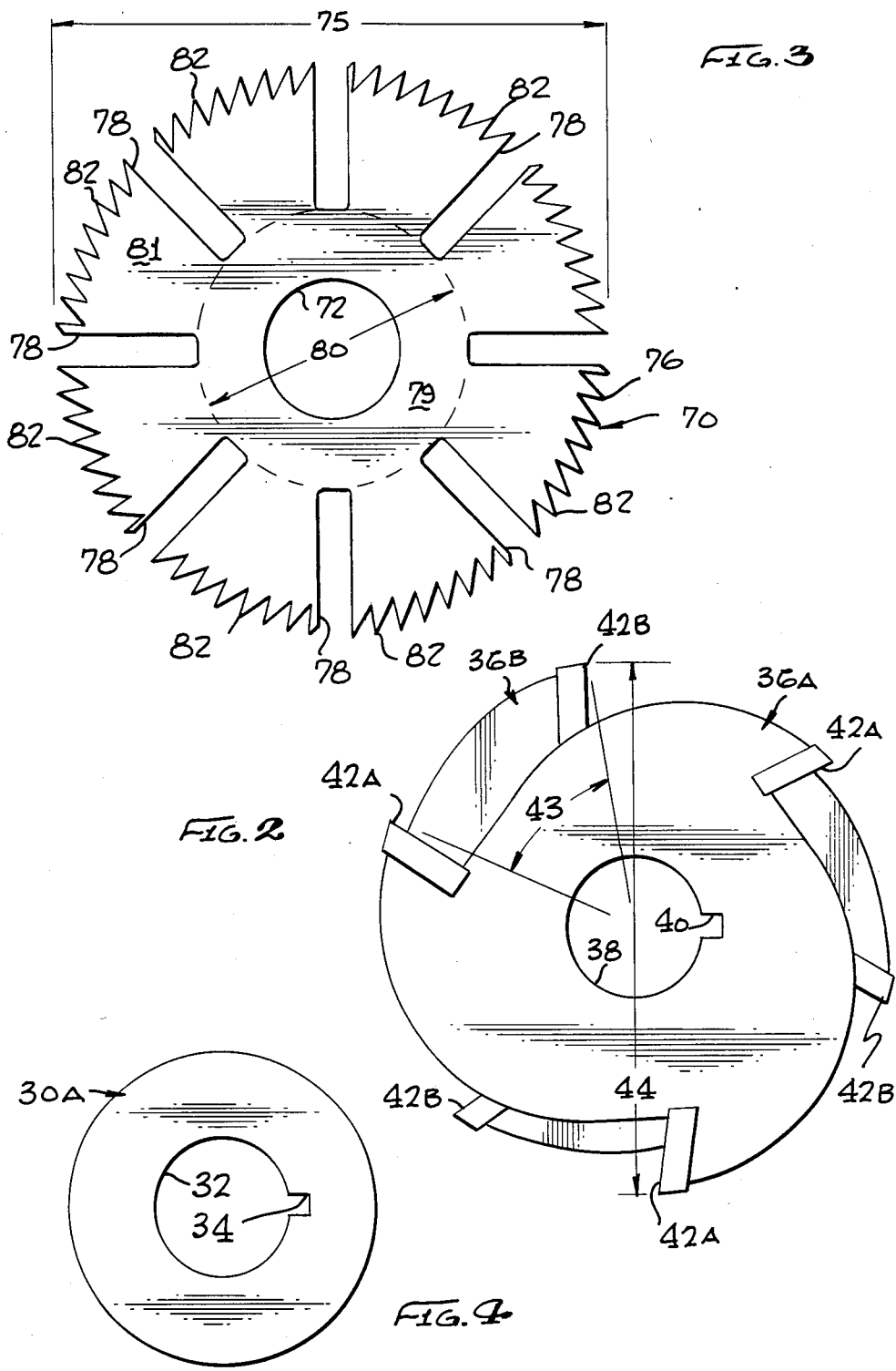

HONEYCOMB CORE CUTTING TOOL

TECHNICAL FIELD

The invention relates to the field of cutters, and in particular to a cutter suitable for machining honeycomb core which simultaneously cuts the core to contour and shreds the material being removed therefrom.

BACKGROUND INFORMATION

Cutting honeycomb core to shape, particularly when complex three dimensional contours are involved, is difficult to accomplish in an economical fashion. First of all, the core must be cut without tearing, burning or deformation to the remaining core, thus, requiring the use of very sharp cutters. Quite often, knife edge cutters are used, but they dull quite quickly, requiring resharpening after only short periods. Since the cutter can only be resharpened a limited number of times, the use of such cutters can be expensive.

This has lead to the use of replaceable cutting edges as, for example, disclosed in U.S. Pat. No. 2,894,583 "Honeycomb Cutter" by D. Johnstad. Here a flange perpendicular to the axis of the shank is mounted at one end thereto. Thus, the entire cutting tool need not be removed from the machine when the cutting edge is dulled, for the ring shaped cutter can easily be replaced. However, such blades are made in relatively small numbers when compared to a typical circular saw blade and, thus are expensive. Also, the knife edge tends to heat up at high cutting rates, which limits cutting speed, less the core be burned. Furthermore, when this cutter is used to cut complex contours there is no means for eliminating the excess material which remains attached until completely cut through.

To eliminate this problem, a secondary cutter of a smaller diameter is often added behind the primary cutter for the simultaneous removal and shredding of the excess material. Such a device is disclosed in U.S. Pat. No. 4,620,821 "Cutting Device for Cutting Honeycomb Light Constructions" by D. Roth. This cutter has somewhat reduced cutting speed because of the secondary cutter design which grinds instead of shreds the removed core. Secondly, it is an expensive tool to manufacture. Also, it would be difficult to use when machining a three dimensional profile for the flat bottom of the primary cutter provides no place for debris from the cut to escape. This problem is eliminated in a bell shaped cutter disclosed in this patent, however this tool is also expensive to manufacture and sharpen because of its non-standard design.

Thus, it is a primary object of the subject invention to provide a honeycomb core cutting tool which can be used to machine three dimensional contours on honeycomb core.

It is another primary object of the subject invention to provide a honeycomb core cutting tool which simultaneously cuts the core and shreds the material being removed.

It is a further object of the subject invention to provide a honeycomb core cutting tool which is inexpensive to manufacture and maintain.

It is still further object of the subject invention to provide a honeycomb core cutting tool which uses ready available inexpensive commercially available cutters.

DISCLOSURE OF THE INVENTION

The invention is a honeycomb core cutting tool wherein a primary cutter is used to cut the core to shape and secondary cutters are used to immediately shred that portion of the core being removed. In detail, the invention comprises a shank having a longitudinal axis and a shaft portion at one end adapted to receive the cutters. A flange having an outwardly concave surface is removably mounted to the shaft. A thin, flat circularly shaped primary cutter is mounted on the shaft. The primary cutter is typically a commercially available circular saw blade modified by the machining of a plurality of peripherally located, radially inward directed slots. These slots divide the primary cutter into a solid inner portion and a slotted outer portion. These segments can be formed easily into a concave shape. A retainer threadably engages the end of the shaft and is used to force the primary cutter against the concave surface of the flange, causing the primary cutter to deform into the concave shape. Mounted behind the flange and primary cutter are two "slot" cutters each having three cutting edges, with the cutting edges of each slot cutter angularly displaced from each other. The primary cutter and secondary cutters are preferably standard commercially available types modified to fit on the shaft.

Once assembled, the cutting tool can be used to cut a three dimensional contoured honeycombed core with the primary cutter cutting the contour and the secondary cutters mounted behind immediately shredding that portion of the core being removed. The concave shape of the primary cutter provides a space thereunder for the debris produced by the cutting edge to collect, thus eliminating damage to the core.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a side elevation view of the cutter partially broken away to show the cross-section thereof.

Illustrated in FIG. 2 is a cross-sectional view of the tool shown in FIG. 1 taken along the line 2—2.

Illustrated in FIG. 3 is a plan view of the tool shown in FIG. 1 taken along the line 3—3.

Illustrated in FIG. 4 is a plan view of the tool shown in FIG. 1 taken along the lines 4—4.

Illustrated in FIG. 5 is cross-sectional view of a concave flange which is mounted on the tool.

Illustrated in FIG. 6 is a partial cross-sectional view of a retainer which is mounted on the tool.

BEST MODE FOR CARRYING OUT THE INVENTION

Referring to FIGS. 1–4 the honeycomb core cutting tool, generally indicated by numeral 10 comprises a shank 12 having a first end 14 for coupling to a chuck or the like of a machine tool (not shown) and a second end 16 for mounting the cutters defining a longitudinal axis, indicated by numeral 18. The second end 16 includes a flange 20 with a cutter mounting shaft 22 extending therefrom having a keyway 24 and an internally threaded bore 26 concentric with the axis 18. Mounted against the flange 20 is a spacer 30A having a hole 32 sized to slidably fit over the shaft 22 and further having a keyway slot 34 for aligning with the keyway 24 for preventing rotation of the spacer about the shank.

Additionally mounted to the shaft 22 are a pair of secondary cutters 36A and 36B separated by a second spacer 30B similar to spacer 30A. These secondary cutters 36A and 36B incorporate mounting holes 38 with keyway slots 40, again for mounting to the shaft 22. The cutters 36A and 36B each have three peripheral cutters 42A and 42B, respectively, which are angularly spaced apart about the axis 18 of the shank 12 by an angle 43. The cutters 36A and 36B have an overall diameter indicted by numeral 44. These secondary cutters are preferably standard "slot" cutters modified by incorporation of the sized hole 38 and keyway slot 40. For example, such "slot" cutters are available from Black & Decker Corporation, Towson, Md. It should be noted that a single secondary cutter could be used if the depth of the cut is small. Thus, the number and/or width of the secondary cutters is a matter of choice, but the two secondary cutter configuration shown is preferred.

Still referring to FIG. 1 and additionally to FIG. 5 it can be seen that a flange 50 is mounted to the shaft 22 by means of a hole 52 and keyway slot 54. The flange 50 is concentric with and extends perpendiclar to the axis 18 and has an overall diameter 56 and includes a concave surface 58 facing away from the second end 16 of the shank 12. The surface 58 includes an inner concave surface 62 at an angle indicated by numeral 64 measured from a plane perpendicular to the axis 18 and with an overall diameter indicated by numeral 65. The angle 64 is preferably 3 to 5 degrees. The surface 58 further includes an outer concave surface 66 with an angle, indicated by the numeral 68, also measured from a plane perpendicular to the axis 18. The angle 68 is preferably 15 to 17 degrees.

Referring specifically to FIGS. 1 and 3, it can be seen that a primary cutter 70 is mounted adjacent to the surface 58 having a mounting hole 72 and an overall diameter indicated by numeral 75. The overall diameter 75 should be greater than the diameter 44 of the secondary cutters 36A and 36B, and preferably 10 to 15 percent greater, to insure tha the core is cut prior to shredding of the material being removed. The cutter 70 is preferably a thin, flat circular cutter having peripheral saw tooth cutters 76 and a plurality of peripheral radially inward directed slots 78, forming an inner solid portion 79 having a diameter indicated by numeral 80 and an outer slotted portion 81, having a plurality of cutter segments 82. The diameter 80 of the inner solid portion 79 should be smaller than the diameter 56 of the flange 50 in order for the flange 50 to provide support for the segments 82 of the outer slotted portion 81. Preferably, the cutter 70 is made from a commercially available circular saw cutter, which again, can be obtained from companies such as Black & Decker.

Still referring to FIGS. 1, 3 and additionally to FIG. 6, it can be seen that the tool further includes a retainer 83 which is used to secure the cutter 70 to the shank 12. The retainer is used to secure the cutter 70 to the shank 12 and includes a flange portion 84 having an overall diameter indicated by numeral 85 and a threaded stud 86 extending therefrom extending into threaded hole 26. The inward facing surface 87 includes a boss 88 for receiving the primary cutter 70, i.e. the boss has a diameter, indicated by numeral 89, that fits into mounting hole 72 of the cutter 70. Surface 87 further includes an outer tapered surface 90 having an angle indicated by numeral 91, to a plane perpendicular to the axis 18 of the shank when the retainer 83 is mounted thereto that preferably is 3 to 5 degrees. The retainer 83 incorporates holes 92 on the side 93 for a spanner wrench (not shown) for attaching the retainer. When the retainer 83 is attached to the shank 12 it forces the cutter 70 into the concave shape, i.e. the segments 82 easily deform to the shape of the surface 58. Again, in order to provide proper support for the segments 82 the overall diameter 86 of the flange portion 84 of the retainer 83 should be greater than the diameter 80 of the inner solid portion 81 and less than the overall diameter 75 of the primary cutter 70. The retainer also creates a space, indicated by numeral 94, between the cutter 70 and tapered surface 90, wherein the inner solid portion 79 can deform (oil can) when the cutter is forced into the concave shape.

Thus, both the primary and secondary cutters are made from inexpensive commercially available cutters, which can be sharpened with standard tools. It is only necessary to machine the hole and keyway slot in the secondary cutters and additionally the radial slots in the primary cutter. This signficantly reduces the cost of manufacturing the cutter as well as the maintenance thereof. It is also readily apparent that the ability to cut complex contours and the immediate shredding of the excess material is obtained when using this cutter. It should be noted that in some applications it is possible to eliminate the secondary cutters, for example, the cutting of very small pieces of one. However, in most applications the secondary cutters are necessary.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

This invention has industrial applicability to the making of composite structures and, in particular, to the machining of honeycomb core materials.

I claim:
1. A honeycomb core cutting tool comprising:
a shank having a longitudinal axis;
a flat circular cutter detachably mounted to one end of said shank, said primary cutter including a plurality of slots spaced about the periphery thereof and extending radially inward dividing said primary cutter into an inner solid portion and an outer slotted portion; and
means mounted to said shank for forming said primary cutter into a substantially concave shape, said means comprising;
a flange mounted to said shank, said flange concentric with and perpendicular to the shank longitudinal axis and having an upwardly facing substantially concave surface; and
a retainer detachably mounted to said shank for causing said primary cutter to substantially conform to said concave surface of said flange when said retainer is mounted to said shank.

2. The cutting tool of claim 1 further including at least one secondary cutter mounted behind said primary cutter having a diameter less than said primary cutter.

3. The tool as set forth in claim 1, wherein said concave surface includes:
an inner portion having an angle to a plane perpendicular to said longitudinal axis of said shank of between 3 and 5 degrees, said inner portion of said surface having a diameter greater than the diameter of said inner solid portion of said primary cutter; and
an outer portion of said surface having an angle to a plane perpendicular to said longitudinal axis of said shank of between 15 and 17 degrees, said outer portion of said surface having a diameter less than said diameter of said primary cutter.

4. The tool as set forth in claim 3, wherein:
said shank includes a threaded hole concentric with said longitudinal axis at said one end;
said retainer comprising;
a stud threadably engaging said hole; and
a retainer flange concentric with and mounted to one end of said stud and extending perpendicularly therefrom, the inner surface of the side of said retainer flange facing said stud including an inner boss and an outer surface at an angle to a plane perpendicular to the axis of said stud between 3 and 5 degrees, the diameter of said retaining flange greater than the diameter of said solid portion of said primary cutter and less than said diameter of said primary cutter; and
said primary cutter including a hole for mounting on said boss.

5. The tool as set forth in claim 4, wherein said at least one secondary cutter has a diameter between 10 and 15 percent less than said diameter of said primary cutter.

6. The tool as set forth in claim 5, wherein there are two secondary cutters, said secondary cutters being slot cutters each having three equally spaced cutting teeth, said cutting teeth of each of said secondary cutters being angularly displaced from each other about said shank axis.

7. The tool as set forth in claim 6, wherein said plurality of secondary cutters are removably mounted to said shank.

8. The tool as set forth in claim 7, wherein said two secondary cutters are spaced from each other along said axis of said shank.

9. The tool as set forth in claim 8, wherein said primary cutter includes saw teeth about the periphery thereof.

* * * * *